United States Patent
Lockett, Jr.

(10) Patent No.: US 6,193,849 B1
(45) Date of Patent: Feb. 27, 2001

(54) FRACTIONATOR WITH LIQUID-VAPOR SEPARATION MEANS

(76) Inventor: William Lockett, Jr., 28 Oak Pl., Bernardsville, Somerset County, NJ (US) 07924

( * ) Notice: Subject to any disclaimer, the term of this patent is extended or adjusted under 35 U.S.C. 154(b) by 0 days.

(21) Appl. No.: 08/426,160

(22) Filed: Apr. 21, 1995

(51) Int. Cl.[7] ............................... B01D 3/14; B01D 3/38; B01D 3/42
(52) U.S. Cl. ............................. 203/2; 196/141; 196/127; 202/158; 202/160; 202/197; 202/269; 203/40; 203/96; 203/97; 203/98; 208/347; 208/358; 208/363; 261/111
(58) Field of Search ................................. 203/1, 2, 4, 40, 203/6, 21, 90, 100, 95, 97, 98, 96, DIG. 22, DIG. 25; 202/181, 160, 202, 269, 253, 158, 162, 197, 176; 196/141, 125–127; 208/347, 358, 363; 261/111; 95/187, 193, 209, 226; 55/255, 256

(56) References Cited

U.S. PATENT DOCUMENTS 1,744,421 * 1/1930 Stroud, Jr. et al. .................... 203/98
3,502,547 * 3/1970 Bridgeford ............................. 203/98
5,326,436 * 7/1994 Sampath et al. .............. 203/DIG. 22

* cited by examiner

Primary Examiner—Virginia Manoharan
(74) Attorney, Agent, or Firm—Kenneth P. Glynn

(57) ABSTRACT

A fractionator has a fractionation vessel, a reactor effluent vapors inlet, a vapor feed contacting zone, a baffled contacting section above the vapor feed contacting zone, a tops section above the baffled contacting section, a heavy bottoms liquid hold-up pool section below the vapor feed contacting zone, a bottoms outlet, a bottoms recycle system with a heat exchanger. Recycled, cooled bottoms is fed back to the fractionation vessel at the heavy bottoms liquid hold-up pool section and above the vapor feed contacting zone. The improvements involve providing a separation tray and downpipe for separating cooler bottoms liquid from hotter product vapors within the fractionation vessel: to avoid condensation and absorption of product vapors by the liquid pool; to have more rapid and uniform quenching of hot liquid entering the pool; and substantially reduce costly onstream maintenance to clean fouled bottoms recycle exchangers.

18 Claims, 2 Drawing Sheets

FRACTIONATOR WITH LIQUID-VAPOR SEPARATION MEANS

BACKGROUND OF THE INVENTION

1. Field of the Invention

This invention relates to a fractionation vessel having physical separation of a fractionation column feed vapor inlet contacting zone from a lower temperature liquid pool immediately below it in order to avoid condensation and absorption by the liquid pool of valuable components in the feed product vapors. The invention is directed to a fractionator and a method which isolates the product vapors from the cooler liquid pool. In addition to desired thermal separation, the invention provides more rapid and uniform quenching of hot liquid entering the bottoms hold-up pool plus facilitates lower temperature operation of the pool to minimize thermal degradation of the bottoms liquid.

2. Information Disclosure Statement

The following patents are representative of the state-of-the-art of fractionation:

U.S. Pat. No. 2,235,329 issued to E. A. Ocon on Mar. 18, 1941 is directed to a method and apparatus for treating a plurality of heavy hydro-carbon oils for subsequent cracking utilizing a fractionation tower which is typical of the prior art and does not utilize a separation tray and downpipe as is used in the present invention.

U.S. Pat. No. 3,133,014 issued to W. J. Cross, Jr. on May 12, 1964 describes a quench system for synthetic crude wherein a fractionation vessel utilizes an improved arrangement for introduction of quench liquid. A separation tray is not used as in the present invention.

U.S. Pat. No. 4,714,542 issued to W. Lockett, Jr. on Dec. 22, 1987 relates to a distillation vapor and feed mixing and subsequent separation process and apparatus which involves the introduction of a vaporizing liquid feed into a flash zone via a tangential nozzle into a mixing and separation chamber which directs the feed into a circumferential path to enhance mixing, and the redirection of rising vapors from the distillation below the flash zone by baffling these vapors into the chamber inlet. The rising vapors are inspirated by the high velocity feed at the inlet side of the chamber and intimate contact and mixing of the rising vapors with the vaporizing feed are enhanced by creating a spinning action. Preferably, the chamber runs peripherally and slightly downward along the inside of wall of the distillation column along an arc no greater than 360°. Alternatively, the mixing section of the mixing and separation chamber may be located outside of the distillation tower and the feed, passing through a jet ejector would inspirate the rising vapors. Increasing contacting and mixing efficiency in a distillation flash zone increases the yield of more valuable overhead product for the same energy input or permits lower energy input for constant separation between overheads and bottom in the flash zone.

Notwithstanding the above-cited prior art, the present invention is neither taught nor rendered obvious thereby.

SUMMARY OF THE INVENTION

The present invention relates to fractionation improvements. Thus, in a fractionator having a fractionation vessel, a reactor effluent vapors inlet, a vapor feed contacting zone, a baffled contacting section above the vapor feed contacting zone, a tops section above the baffled contacting section, a heavy bottoms liquid hold-up pool section below the vapor feed contacting zone, a bottoms outlet, a bottoms recycle system with a heat exchanger with recycled, cooled bottoms fed back to the fractionation vessel at the heavy bottoms liquid hold-up pool section and above the vapor feed contacting zone, the improvements involve providing within the fractionation vessel a separation tray and downpipe for separating liquid from vapor within the fractionation vessel for thermal separation and increased efficiency. The separation tray and downpipe are located above the bottoms liquid hold-up pool and below the vapor feed contacting zone. The downpipe includes a vapor sealing mechanism, e.g. a sealing tray, or, preferably, with the downpipe extending into the pool. The invention also relates to fractionation processes utilizing the separation tray/downpipe improvements.

BRIEF DESCRIPTION OF THE DRAWINGS

The present invention should be more fully understood when the specification herein is taken in conjunction with the drawings appended hereto wherein.

DETAILED DESCRIPTION OF THE PRESENT INVENTION

Figure 1:
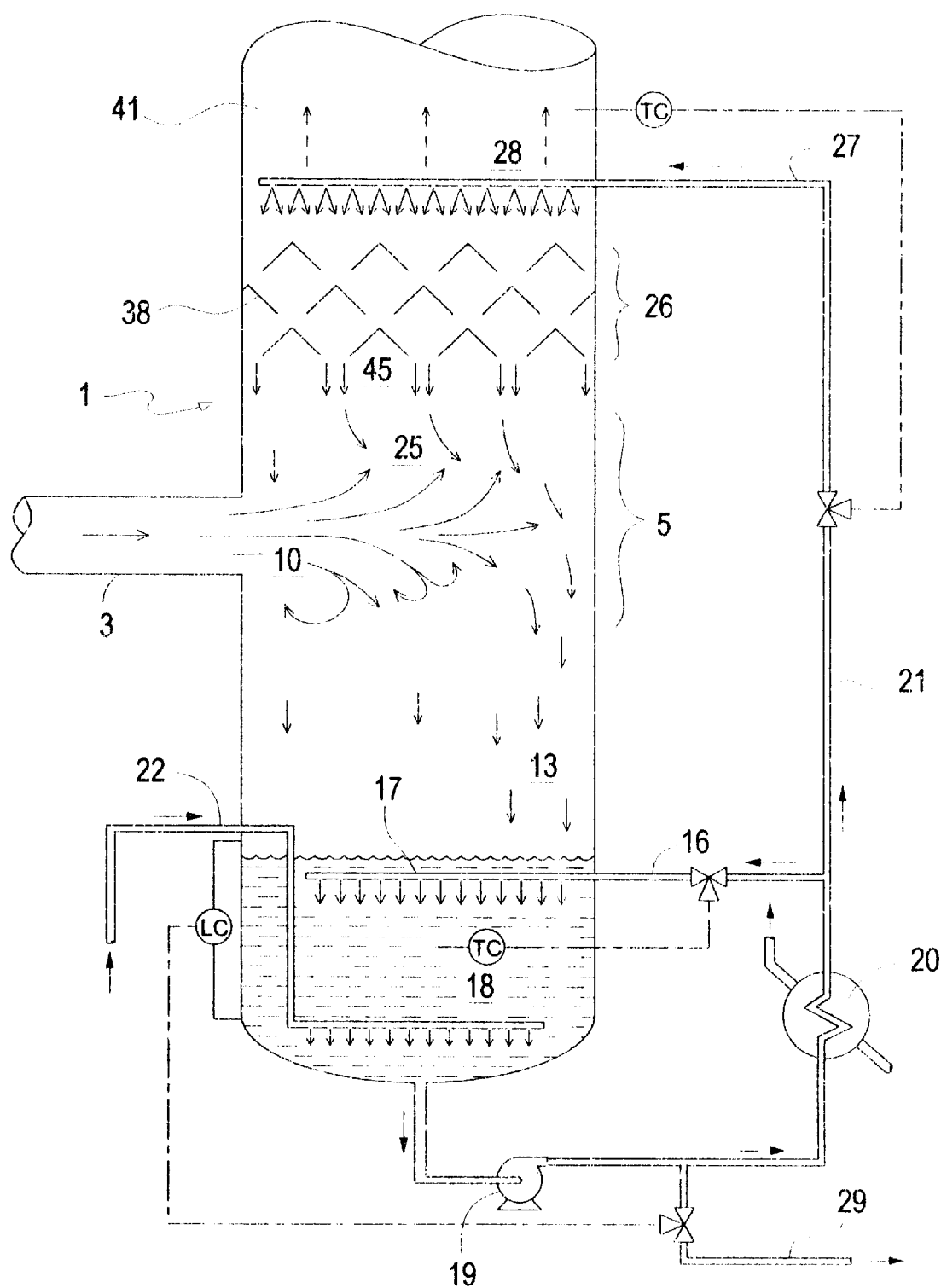
FIG. 1 illustrates a schematic flow diagram prior art fractionation system; and, FIG. 2 illustrates a schematic flow diagram of one embodiment of the invention.

Historically, high temperature effluent vapors (averaging about 1000° F.) from a process unit reactor (for example, a fluid catalytic cracker) generally enter into a fractionator at a vapor inlet contacting zone wherein the vapors are mixed with a cooler liquid stream that is free falling from above into the vapor inlet contacting zone to lower the reactor effluent vapor temperature (from about 1000° F. down to about 850° F.) in the contacting zone for the purpose of significantly inhibiting undesirable cracking of the reactor effluent vapors. Liquid gravitating downward from the vapor inlet contacting zone enters a large heavy bottoms liquid hold-up pool section where it is typically quenched within the liquid pool by introduction of a colder stream. This additional quenching results in a liquid pool temperature averaging about 700° F. This quench is used to mostly control thermal cracking and/or polymerization of various components in the bottoms liquid. Thermal cracking and/or polymerization degrades a portion of the pool liquid producing gas an soft, sticky-like particulates which cause serious fouling of heat exchangers and equipment in the fractionator bottoms liquid pumparound and recycle systems.

Reactor effluent vapor streams in Fluid Catalytic Cracking Units and Fluid Cokers also typically contain small hard particles of catalyst and coke, respectively, that enter into the fractionator column inlet vapor contacting zone. These hard particles are normally recovered from the reactor effluent vapors by recirculating a large quantity of fractionator bottoms liquid through a baffled or shed section located immediately above the vapor contacting zone. In addition, this recirculating relatively cooler liquid lowers the hot reactor effluent vapor temperature.

Current operating practice may include a device to distribute the quench liquid stream within the liquid pool. However, the hot liquid from the vapor inlet contacting zone enters the pool in concentrated areas, mostly in the area of the inner vessel wall opposite the feed vapor inlet. Reactor effluent vapors enter into the vapor inlet contacting zone at a velocity of more than 100 ft/sec, causing a large portion of the liquid droplets to impinge, coalesce and gravitate downward in concentrated areas. In addition, some of the hard particles recovered from the entering reactor vapors, agglomerate with some of the soft sticky-like coke particulates to form large particles. Injection of steam vapors into the bottom of the liquid pool is generally practiced to maintain a more uniform distribution of the particles in the bottoms liquid.

Previous and current process economics strongly favor operation of the bottoms liquid pool at as high a temperature as possible to minimize the presence of valuable product components in the fractionator bottom liquid. However, most refiners are currently obliged to operate with a lower than optimum liquid bottoms temperature specifically to limit the amount of thermal degradation of bottoms liquid in the pool because of the serious equipment fouling problem. In addition, some refiners inject expensive inhibitors and anti-coking chemicals to alleviate the fouling problems but with limited success.

Any steps that can be taken to reduce or limit bottoms liquid thermal cracking is resorted to because of the extensive and expensive cost for cleaning exchangers and equipment, which sometimes forces the refiner to operate below target feed rate, resulting in an important financial loss. Another important debit in current operations is the unwanted condensation/absorption and loss of valuable reactor product components to the bottoms liquid purge stream.

In accordance with the invention, a special tray with a downpipe isolates the fractionator vapor feed inlet contacting zone from the heavy bottoms liquid hold-up pool section. This process and apparatus change separates the inlet contacting zone, in which high temperature reactor effluent vapors are contacted with downflowing cooler heavy liquid to obtain a reasonable intermediately high temperature mixture of vapors and liquid from the much colder liquid pool located below it, typically in the fractionator column bottom. The intermediately higher temperature liquid gravitates from the vapor contacting zone onto a separation tray, e.g. a sloped tray, and flows into a central downcomer or downpipe where the liquid flows into the liquid hold-up pool section. In preferred embodiments, within the downpipe the hot liquid may be uniformly quenched to a desired lower temperature before entering the liquid hold-up pool. These improvements facilitate fractionator operation at much lower than current normal bottoms pool temperatures, well below 750° F., e.g. 650° F. to 690° F., to essentially minimize thermal cracking and/or polymerization in the pool and greatly reduce production of harmful sticky-like soft particulates known to seriously plug heat exchangers and other equipment. These improvements also provide a steam blanket between the underside of the separation tray and the heavy bottoms liquid pool to also inhibit product vapor entering into the heavy bottoms liquid pool.

In addition to important savings in bottoms pumparound heat exchanger cleaning costs, the separation tray avoids the condensation and absorption of valuable product components in the fractionator feed vapors by the cooler, low value liquid in the pool, resulting in a higher yield of valuable products and reduced recycling of material to the reactor which permits some process units to operate at a higher fresh feed rate, calculated to be at least 2 percent. For units operating under a maximum feed rate limitation, this can be worth several millions of dollars per year to a typical refiner. For those units not operating at maximum feed rate, reducing recycle flow rate to the reactor results in energy savings and a yield credit worth at least $1,000,000.00 per year, based on 1995 fuel and product values, for a typical fluid catalytic cracker.

Thus, the present invention separates the hot vapor inlet contacting zone from the colder liquid bottoms to avoid/minimize downgrading of valuable products. It is also directed toward more rapid and uniform quenching of hot liquid from the feed contacting zone plus facilitate operation at lower bottoms liquid temperature than current operating practice to effectively lower thermal degradation of bottoms liquid which, otherwise, causes excessive fouling and plugging in the fractionator bottoms stream heat exchangers and other equipment. This process and apparatus are applicable to any fractionation, scrubber of distillation column but are particularly useful for new and existing Fluid Catalytic Cracking Units, Fluid Cokers and some Delayed Coker Units in which a much colder liquid exists immediately below the fractionator feed inlet contacting zone.

FIG. 1 shows a typical prior art fractionator. In FIG. 1, the lower portion of a fractionation vessel 1 is shown. A stream of high temperature reactor effluent vapors 10 is introduced via line 3 into the fractionator column feed vapor contacting zone 5 wherein the reactor effluent vapors 10 are partially cooled and some of the heavy boiling range unconverted reactor feed is condensed by cooler bottoms liquid stream, shown as liquid stream 45, gravitating from the shed baffled contacting section 26 located above the feed vapor contacting zone 5. The intermediate temperature liquid 13 downflows from the vapor inlet contacting zone 5 directly into heavy bottoms liquid hold-up pool section 18. Quenching liquid 16 contacts the downpouring hot liquid 13 via a quench injection distributor 17. The intermediate temperature liquid 13 flows into the heavy bottoms liquid hold-up pool section 18 in concentrated areas such as the wall area furthest away from line 3. The fractionator bottoms liquid is pumped via pump 19 through pumparound heat exchanger 20, where it is typically cooled by generating steam, and the cooled liquid is conventionally used for quenching liquid 16 and pumparound liquid 21. A small, superheated steam purge line 22, typically enters into the heavy bottoms liquid hold-up pool section 18, to mix the solids in bottom liquid. The product vapors 25 pass upward from the feed vapor contacting zone 5 through the shed contacting baffles 38 to mix with the downflowing cooled bottoms pumparound liquid 21 from distributor 27. The baffled contacting section 26 completes cooling of valuable product vapors and condensing of unreacted feed in addition to recovering fine particulates from these vapors. The product vapors 28 exit upward into the top section 41 for further fractionation in the upper portion of the fractionation vessel 1. A small bottoms liquid purge stream 29, sometimes called recycle or cycle oil, consists primarily of very high boiling range unconverted feed that may be typically recycled to the reactor. This prior art fractionator results in the various problems resulting from trying to maintain liquid pool section 18 at low enough temperatures to inhibit solids formation, yet high enough to achieve the desired fractionation.

In the present invention, the improvement separates the hot vapors in the vapor contacting zone from the cold liquid and more uniformly and rapidly quenches the liquid gravitating from the contacting zone. In addition, the pool temperature can be substantially lowered to significantly reduce or eliminate generation of fouling material that plagues the bottom liquid equipment operation in the prior art. fractionators.

Figure 2:
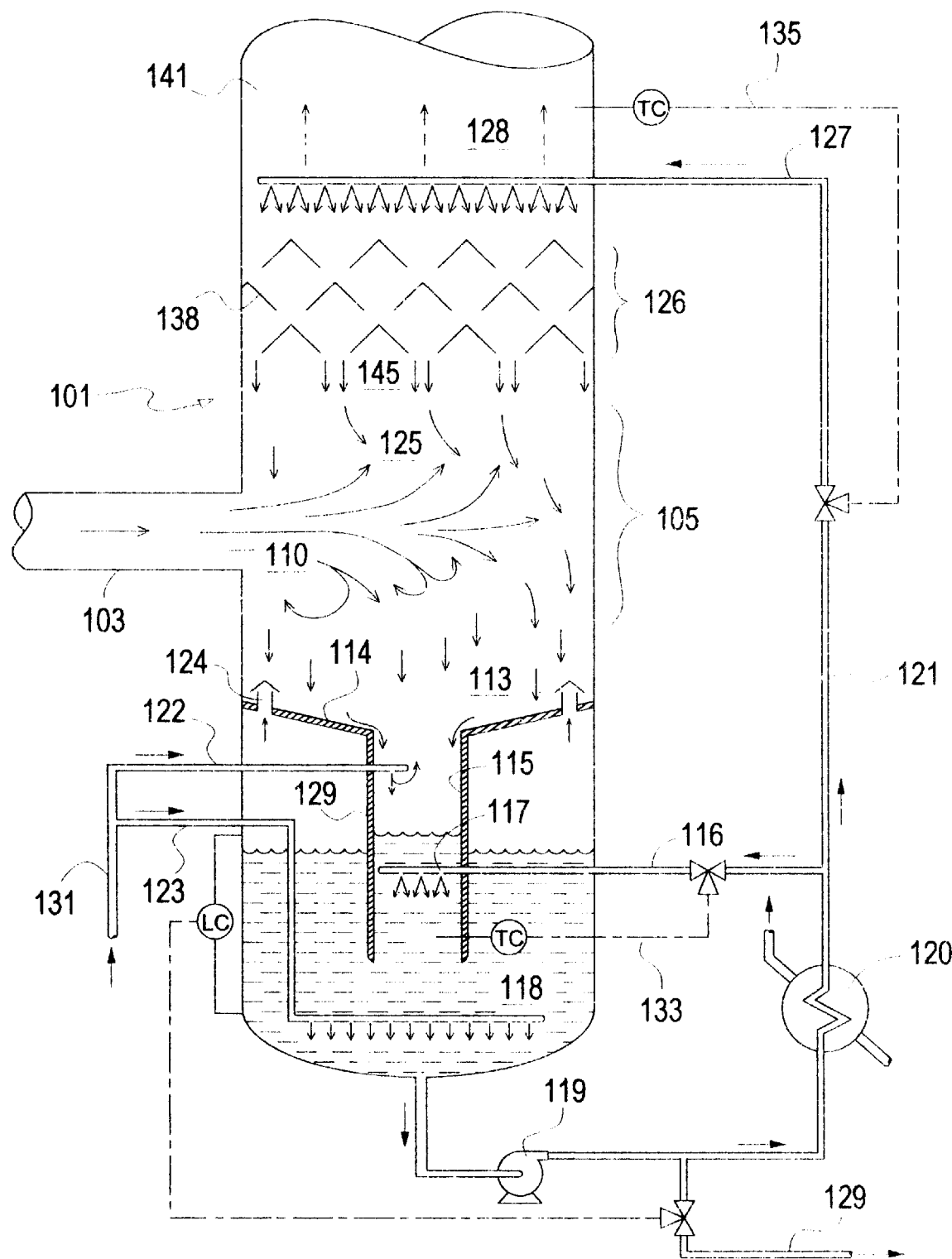

Some preferred embodiments of the present invention will be described with reference to FIG. 2. In FIG. 2, the lower portion of a fractionation vessel 101 is shown. A stream of high temperature reactor effluent vapors 110 is introduced via line 103 into the fractionator column feed vapor contacting zone 105 wherein the reactor effluent vapors 110 are partially cooled and some of the heavy boiling range unconverted reactor feed is condensed by cooler bottoms liquid stream, shown as liquid stream 145, gravitating from the baffled contacting section 126 located above the feed vapor contacting zone 105. The intermediate temperature liquid 113 downflows from the vapor inlet contacting zone 105 onto the sloped separation tray 114 to enter a downpipe 115; each are optionally, but preferably, insulated with insulation layer 129 to minimize heat transfer through the metal fabricated separation tray 114 and downpipe 115. Within the bottom section of downpipe 115, the bottoms quenching liquid 116 contacts the downpouring hot liquid 113 via a quench injection distributor 117. This is typically controlled by thermocouple control mechanism 133. The quenched liquid underflows from the bottom of the downpipe 115 into the heavy bottoms liquid hold-up pool section 118. The fractionator bottoms liquid is pumped via pump 119 through pumparound heat exchanger 120, where it is typically cooled by generating steam, and the cooled liquid is conventionally used for quenching liquid 116 and pumparound liquid 121. From main superheated steam purge line 131, a small, superheated steam purge line 122, enters into the upper portion of downpipe 115 and this steam passes upwards in downpipe 115 to displace product vapors from downpipe 115. Additional superheated steam typically enters into the heavy bottoms liquid pool section 118, via distributor 123, to mix the solids in bottoms liquid and pass upward in the pool to flow through optional vents 124 in separation tray 114, forming an effective steam blanket above the liquid pool and below the separation tray 114. The product vapors 125 pass upward from the feed vapor contacting zone 105 through the shed contacting baffles 138 to interact with the downflowing cooled bottoms pumparound liquid 121 from distributor 127. In some embodiments, flow of this quenching liquid through distributor 127 is controlled by thermocouple control mechanism 135. The shed section 126 completes cooling of valuable product vapors and condensing of unreacted feed in addition to recovering fine particulates from these vapors. The product vapors 128 exit upward into the top section 141 for further fractionation in the upper portion of the fractionation vessel 101. A small bottoms liquid purge stream 129, sometimes called recycle or cycle oil, consists primarily of very high boiling range unconverted feed that may be typically recycled to the reactor.

Obviously, numerous modifications and variations of the present invention are possible in light of the above teachings. It is therefore understood that within the scope of the appended claims, the invention may be practiced otherwise than as specifically described herein.

What is claimed is:

1. In a fractionator having a fractionation vessel, including a reactor effluent vapors inlet, a vapor feed contacting zone, a baffled contacting section above said vapor feed contacting zone, a top section above said baffled contacting section, a heavy bottoms liquid hold-up section below said vapor feed contacting zone, a bottoms outlet, and a bottoms recycle system having a heat exchanger in which a recycled, cooled bottoms is fed back to said fractionation vessel to said heavy bottoms liquid hold-up pool section and above said vapor feed contacting zone, the improvement which comprises:

a separation tray and downpipe for separating hotter vapors from cooler liquid within said fractionation vessel, said separation tray being located above said bottoms liquid hold-up pool and below said vapor feed contacting zone, said downpipe being connected to said separation tray and extending downwardly from said separation tray and into said bottoms liquid hold-up pool as to establish vapor sealing means for preventing said hotter vapors from directly contacting said cooler liquid.

2. The fractionator of claim 1 wherein said separation tray is tapered downwardly in a direction toward said downpipe to efficiently channel the downflowing liquids into the downpipe.

3. The fractionator of claim 2 wherein said bottoms recycle system includes temperature sensing means located within said bottoms liquid hold-up pool section near the outlet of said downpipe.

4. The fractionator of claim 1 wherein said downpipe has a quenching liquid outlet contained therein which extends from said bottoms recycle system.

5. The fractionator of claim 4 wherein said bottoms recycle system includes temperature sensing means located within said bottoms liquid hold-up pool section near the outlet of said downpipe.

6. The fractionator of claim 4 wherein said fractionator includes temperature sensing means located within said downpipe to allow more rapid and uniform quenching of said heavy bottoms liquid from said vapor contacting zone.

7. The fractionator of claim 1 wherein said separation tray includes a plurality of hooded vents.

8. The fractionator of claim 1 wherein said fractionator is a petroleum fractionator.

9. The fractionator of claim 1 wherein said fractionator is a petro-chemical fractionator.

10. The fractionator of claim 1 wherein said fractionator is a chemical fractionator.

11. The fractionator of claim 1 wherein said heavy bottoms liquid hold-up pool section further includes a steam inlet to provide steam to said bottoms liquid and to form an effective steam blanket above said bottoms liquid and below said separation tray.

12. In a fractionation process utilizing a fractionation vessel for separation of stream components having different boiling points wherein component vapors are fed into a vapor feed contacting zone, wherein said lower boiling point components separate and pass upwardly above said vapor feed contacting zone, and high boiling point liquid components separate and gravitate into a heavy bottoms liquid hold-up pool section located below said vapor feed contacting zone and are removed therefrom via a bottoms outlet, which process also includes utilizing a bottoms recycle system having a heat exchanger in which a recycled, cooled bottoms is fed back to said fractionation vessel into the heavy bottoms liquid hold-up pool section and above said vapor feed contacting zone, the improvement which comprises:

preventing condensation and absorption of valuable product vapors by cooler heavy bottoms liquid by providing thermal and physical insulation between said vapor feed contacting zone and said pool section by including within said fractionation vessel a separation tray and downpipe to thereby separate cooler heavy bottoms liquid from hotter product vapors within said fractionation vessel, said separation tray and downpipe being located above said bottoms liquid hold-up pool and below said vapor feed contacting zone, said downpipe being connected to said separation tray and extending downwardly from said separation tray and into said bottoms liquid hold-up pool so as to establish vapor sealing means for preventing said hotter vapors from directly contacting said cooler liquid.

13. The process of claim 12 wherein said separation tray is tapered downwardly in a direction toward said downpipe.

14. The process of claim 12 wherein said downpipe has a quenching liquid outlet contained therein which extends from said bottoms recycle system.

15. The process of claim 12 wherein said separation tray includes a plurality of hooded vent pipes.

16. The process of claim 12 wherein said downpipe includes a temperature sensing means to control quenching of said liquid from said vapor contacting zone.

17. The process of claim 12 wherein said process further includes injecting steam into said heavy bottoms liquid hold-up pool via a steam inlet located thereto to provide steam to said bottoms liquid and to form an effective steam blanket above said bottoms liquid and below said separation tray.

18. The process of claim 12 wherein said process is selected from the group consisting of petroleum fractionation, petro-chemical fractionation and chemical fractionation.

* * * * *